United States Patent [19]
Hwang et al.

[11] Patent Number: 5,714,863
[45] Date of Patent: Feb. 3, 1998

[54] CIRCUIT FOR ENHANCING POWER DELIVERY OF AN ENERGY SOURCE

[75] Inventors: B. Chester Hwang, Alpharetta; Ashok Ramakant Patil, Duluth, both of Ga.

[73] Assignee: Motorola, Inc., Schaumburg, Ill.

[21] Appl. No.: 602,523

[22] Filed: Feb. 20, 1996

[51] Int. Cl.$^6$ .................................................. H02M 7/515
[52] U.S. Cl. ................................................ 320/1; 363/101
[58] Field of Search .................... 320/1, 5, 13, 14, 320/50; 363/101; 323/259, 344

[56] References Cited

U.S. PATENT DOCUMENTS

| | | | |
|---|---|---|---|
| 4,184,197 | 1/1980 | Cuk et al. | 363/16 |
| 4,801,859 | 1/1989 | Dishner | 323/224 |
| 5,307,002 | 4/1994 | Ho et al. | 320/39 |
| 5,442,534 | 8/1995 | Cuk et al. | 363/16 |
| 5,451,962 | 9/1995 | Steigerwald | 342/175 |
| 5,479,089 | 12/1995 | Lee | 323/283 |

*Primary Examiner*—Peter S. Wong
*Assistant Examiner*—Patrick B. Law
*Attorney, Agent, or Firm*—Scott M. Garrett; Kenneth M. Massaroni; Kelly A. Gardner

[57] ABSTRACT

The power delivery of an energy source (10) is enhanced by a dual function circuit. The circuit utilizes a storage capacitor (32) to store a voltage higher than the source voltage by transferring charge from the energy source to the storage capacitor between current pulses (16), than transferring charge from the storage capacitor to the load during current pulses. This is achieved by the novel combination of a boost converter (40) operating in conjunction with a buck converter (45).

10 Claims, 5 Drawing Sheets

CIRCUIT FOR ENHANCING POWER DELIVERY OF AN ENERGY SOURCE

TECHNICAL FIELD

This invention relates in general to power control circuitry, and in particular to circuitry for enhancing the power delivery of an energy source.

BACKGROUND

Portable energy sources, such as electrochemical batteries, are being used in an increasing variety of applications. Many portable electrical and electronic devices require high performance energy sources. For example, cordless power tools require batteries which can sustain high power delivery for prolonged periods, but which also must be rechargeable in a matter of minutes without sacrificing service life. There are many applications which require high power density, that is, the ability to provide high power from a source having a small volume.

A critical parameter in designing an appropriate power source is the inherent electrical series resistance of the energy source. In general, as the size of the energy source increases, it's resistance decreases. This conflicts with the desire to have a small energy source, particularly in consumer devices such as cellular phones, where light weight is considered a critical marketing aspect.

In portable communications devices, power delivery is becoming increasingly important. The implementation of time division-multiple access (TDMA) systems is considered to be one solution to the problem of frequency spectrum allocation in communications. The basic scheme is to have multiple users on a common frequency channel, but each user is allocated only a portion of a cyclical time period. By use of speech compression and other digital techniques, the flow of real-time voice information is perceived as continuous. In these systems, the user transmits, for example, once every second for a duration of 100 ms, allowing up to 10 conversations to take place on the same channel, without overlap or crosstalk. However, since the voice information has been compressed, to maintain audio quality it is important that the compressed information be transmitted at a high power to ensure clear reception. This results in a regular series of current pulses being drawn from the energy source. While the average current drawn may be equal, or even less than that of conventional systems, the high peak value of the current pulse drops the source voltage significantly due to the series resistance of the energy source.

Referring now to FIG. 1, there is illustrated therein a schematic diagram of battery energy source 10 powering a pulsed communications device 12. The battery has an inherent resistance 14, comprised of electrochemical resistances, series resistances of conductors used to interconnect battery cells, etc. For example for a six cell nickel-cadmium battery, a resistance of 200 milliohms may be typical, but depending on state of charge, temperature, and age, it can easily reach 500 milliohms or more. FIG. 2 shows a graph of voltage and current provided by the battery versus time. The current trace 16 shows the current pulses at regular intervals having a peak of, for example, two amperes. The voltage trace 18 shows voltage delivered to the device 12, and the effect that the current pulses have on the source voltage. As an example, a six cell battery in good condition providing 2A pulses will suffer a voltage drop of 2A×0.2 ohms=0.4 volts. This voltage drop will cause a premature end-of-charge condition to be reached where the battery cannot provide enough voltage during the current pulse to power the device's transmitter.

To counteract this effect, a capacitor 20 may be added in parallel with device 12. The capacitor will also have a series resistance 22, but it will be much smaller than that of the battery. This is an elementary technique for filtering voltage ripple in low current systems, however, because of the high level and relatively long duration of the current pulse, coupled with the limitations on energy source size, the design of the capacitor is non-trivial. It must have a very large volumetric capacitance (capacitance per unit volume). Electrolytic components, such as aluminum or tantalum capacitors, are physically large, and may not fit within the desired energy source package size.

The need for more capacity dense components has been answered by electrochemistry. Electrochemical capacitors provide high volumetric capacitance, and have low series resistance. The components have volumetric capacitances on the order of farads per cubic centimeter. Once such a component is placed in parallel with the device 12, an enhanced voltage trace 24 is obtained. The high power delivery of the capacitor enhances the overall power delivery of the energy source. The enhanced voltage trace shows the expected effect; less deviation from the nominal voltage during the current pulse.

Electrochemical capacitors, however, are not without drawbacks. Chief among these at this time is the fact that the technology is still young. Accordingly, the performance of commercially available electrochemical capacitors is not yet robust enough for many applications, and the technology is still somewhat costly to produce. Certainly these obstacles will be overcome in time.

A second problem with these components results from the very feature that makes them desirable. They store large amounts of energy, and release that energy very quickly. A one farad capacitor charged to 6 volts contains 18 joules of energy. In certain applications, such as with intrinsically safe rated equipment, this level of energy storage would not be permissible. Lastly, since the capacitor, as shown in FIG. 2, cannot deliver current until the voltage is pulled down by a load, it must permit some voltage sag in the source voltage. Therefore there is a need for an apparatus which enhances the power delivery of an energy source cost effectively with readily available technology, does so without the potential of unrestricted power delivery, and can minimize voltage sag during current pulses.

DETAILED DESCRIPTION OF THE PREFERRED EMBODIMENT

Figure 1:
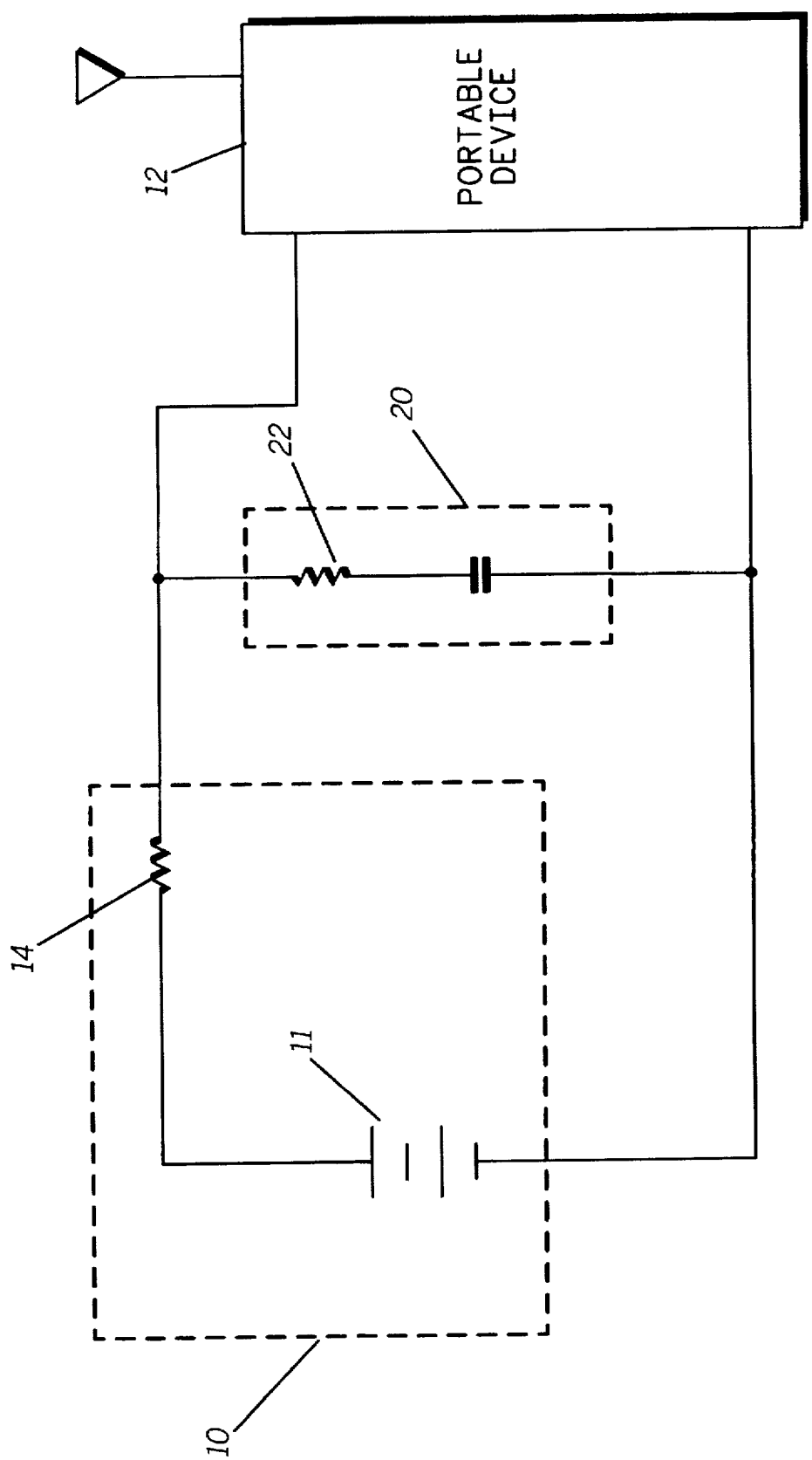
FIG. 1 is a schematic diagram of a prior art circuit for enhancing power delivery of an energy source.

While the specification concludes with claims defining the features of the invention that are regarded as novel, it is believed that the invention will be better understood from a consideration of the following description in conjunction with the drawing figures, in which like reference numerals are carried forward.

Figure 3:
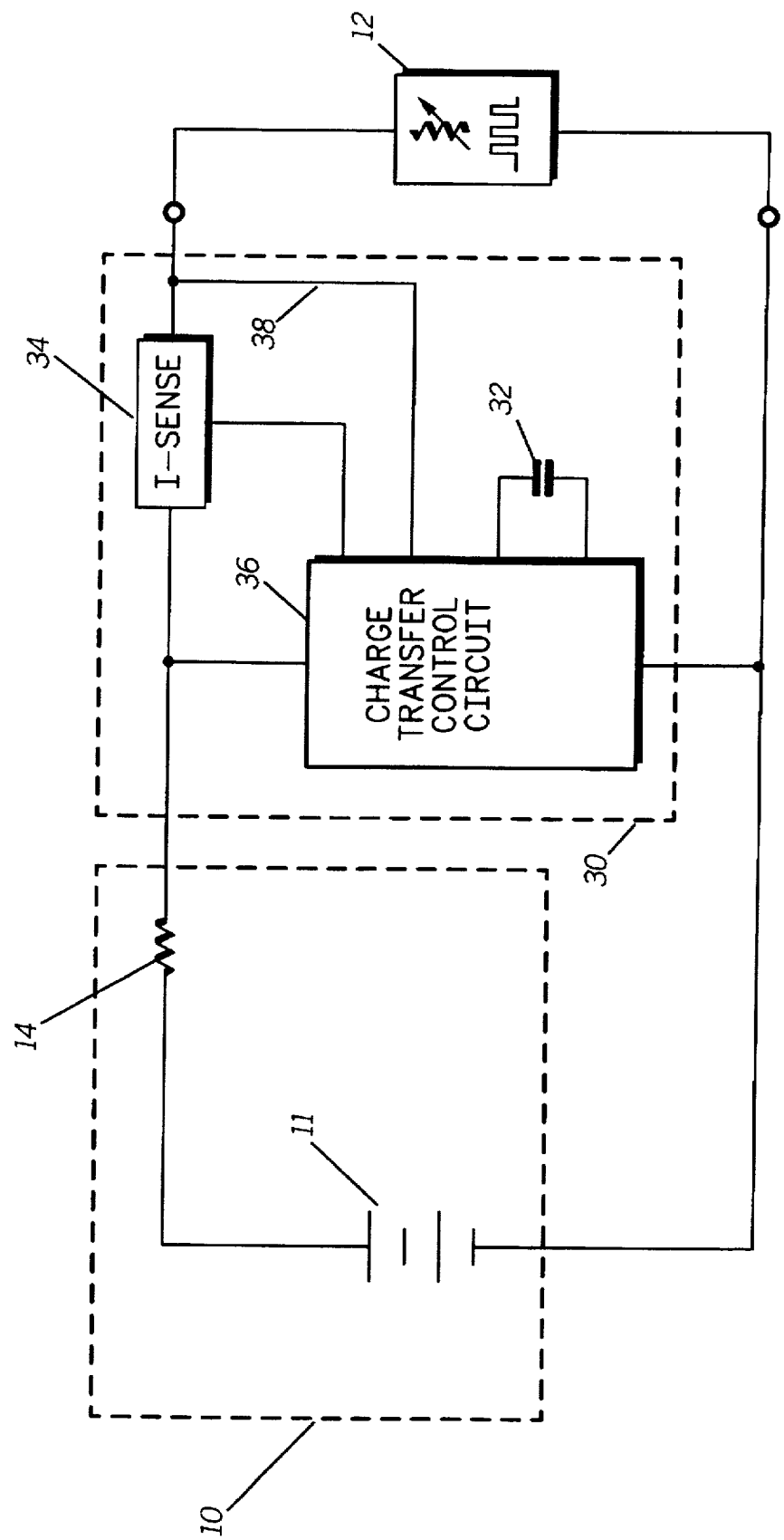
FIG. 3 is a block diagram of a circuit in accordance with the invention.

The deficiencies with regard to the prior art mentioned above can be overcome by the application of power converter technology. Through a novel combination of power converter techniques, it is possible to effectively multiply the effect of a storage capacitor such that a much smaller capacitance may be employed with similar results. Referring now to FIG. 3, there is illustrated therein a block diagram of a circuit in accordance with the invention. There is shown an energy source, such as a battery 10, having at least one battery cell 11, series resistance 14, and containing an electrical charge. A circuit 30 is used for enhancing the power delivery of the energy source, and is comprised of a storage capacitor 32, a current sense circuit 34, and a charge transfer control circuit 36. The capacitance of the storage capacitor is much smaller than that required for bulk filtering of the output, as illustrated in FIG. 1, and consequently, it may be physically smaller as well.

The circuit operates as follows: the charge transfer control circuit comprises a means for charging the storage capacitor and a means for discharging the storage capacitor. The means for charging the capacitor transfers charge from the energy source to the capacitor between current pulses, until the storage voltage, the voltage across the capacitor, reaches a predetermined level. The predetermined level is preferably substantially higher than the source voltage of the energy source. Upon the occurrence of the next current pulse after the storage capacitor has been charged the predetermined storage voltage level, the means for discharging begins transferring charge from the storage capacitor to the load 12 during the current pulse, until the termination of the current pulse. In order for these events to occur at the proper time, the current sense circuit detects the current pulses and signals the charge transfer control circuit with the appropriate information. Preferably this information is in the form of a logic signal, a first level indicates when a pulse is occurring, a second level indicates the absence of a current pulse. In addition, the charge transfer control circuit should sample the source voltage, such as by line 38, as a reference level.

Figure 4:
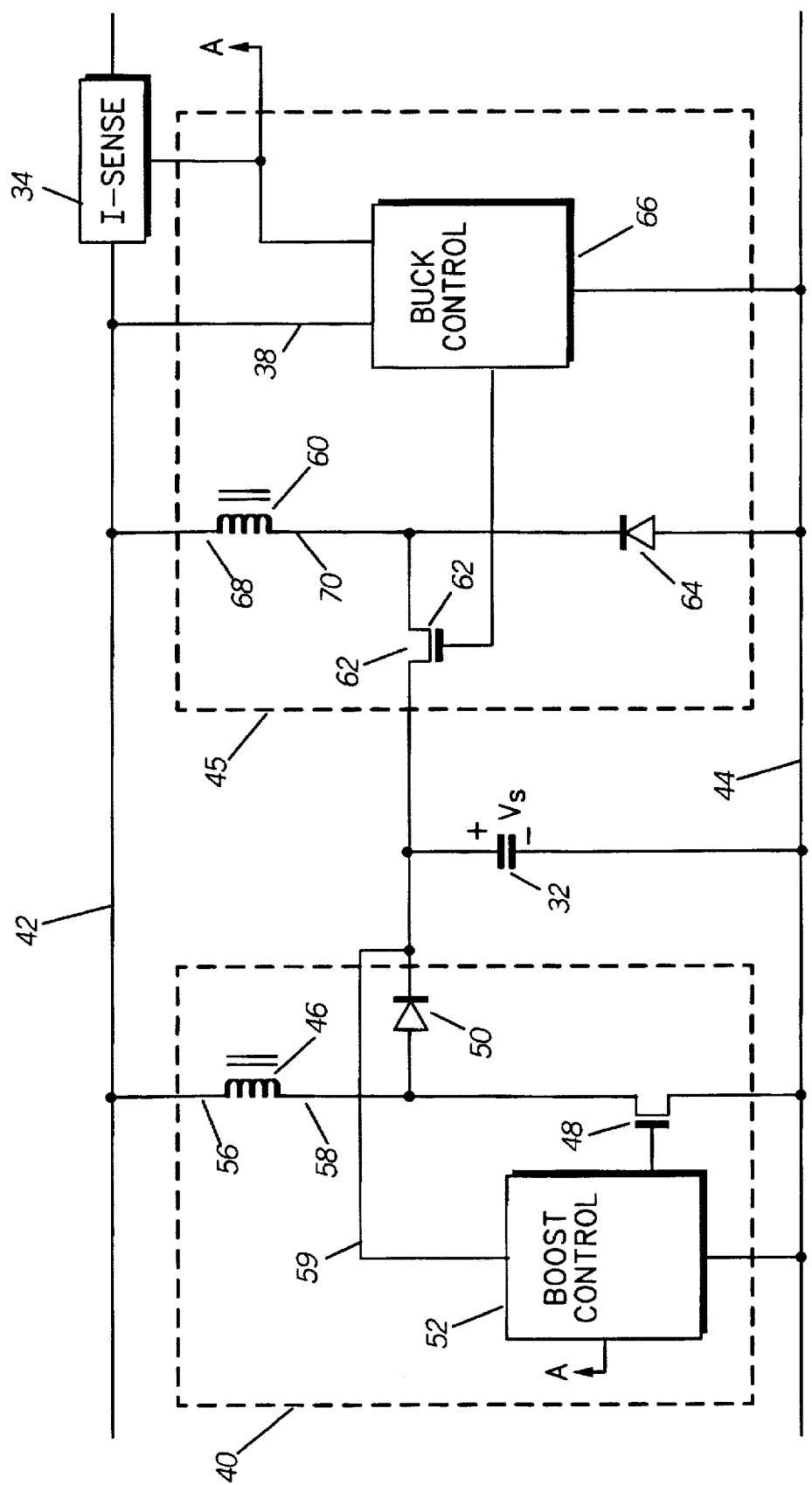
FIG. 4 is a detailed block diagram of a circuit in accordance with a first embodiment of the invention.

The apparatus for executing this method is illustrated in more detail in FIG. 4. Referring now to FIG. 4, there is illustrated therein a detailed block diagram of a circuit in accordance with a first embodiment of the invention. To implement the means for charging, a step-up, or boost converter 40 is connected between the power line 42, and the storage capacitor 32. In this illustration it can be seen that the storage capacitor 32 is referenced to the return line 44. To implement the means for discharging, a step-down, forward mode, or buck converter 45 is connected between the storage capacitor and the power line 42. Other methods may be used for each of these. For example, numerous types of capacitive charge pumps exist which could transfer charge from the energy source to the storage capacitor, and a linear regulator could be used to transfer charge from the storage capacitor to the load. However, these methods are not as effective as switched mode power converter technology, and it is therefore preferred that the boost and buck circuits be used to accomplish their respective tasks.

The boost converter comprises an inductor 46, a boost switch 48, a boost diode 50, and a boost control circuit 52. The inductor has first and second terminals 56 and 58, with the first terminal connected to the power line 42. The boost switch 48 is coupled between the second terminal 58 of the inductor and the return line 44. The boost diode is coupled between the second terminal of the inductor and the storage capacitor. The boost control circuit 52 is responsive to the storage voltage and the occurrence of the current pulses, and controls operation of the boost switch such that the storage capacitor is charged to a predetermined voltage between current pulses. The boost control circuit uses line 59 for sensing the storage voltage across the storage capacitor. The basic circuit employed here, a boost converter, is well known in the art, and numerous published texts and article describe the details of implementation such as component value selection and other design parameters.

In practice, the boost mode converter is configured such that it is enabled when the current conducting though the power line is less than some threshold, as indicated by the current sense circuit 34 by signal A. The threshold is chosen such that when the current level reaches a level indicative of a current pulse, the output of the current sense circuit changes from a first level to a second level. If the current sense circuit indicates that no current pulse is presently occurring, i.e. between current pulses, and the storage voltage of the storage capacitor is below the predetermined level, then the boost control circuit begins switching the boost switch until enough charge has been transferred from the battery to the storage capacitor so that the storage voltage reaches the predetermined level. It is important that the switching frequency and the inductor value are such that the storage capacitor may be charged to the predetermined voltage between current pulses. For the sake of simplicity, the boost switch may be operated at a fixed duty cycle.

To enhance the power delivery of the energy source, when a current pulse, or more precisely, a step decrease in load impedance occurs, the buck converter circuit begins transferring charge to the load from the storage capacitor, assuming the boost converter has charged the storage capacitor. This can be done when the current sense circuit 34 detects a current pulse, or it can be done by sampling the source voltage. Since the source voltage will drop slightly when the current pulse is initially drawn from the energy source, the voltage drop can be detected and used to infer the occurrence of a current pulse. The buck converter, as with the boost converter, is well known in the art, and comprises a buck inductor 60, a buck switch 62, a buck diode 64, and a buck control circuit 66. The buck inductor has a first terminal 68 connected to the power line 42. The buck switch is coupled between the second terminal 70 of the buck inductor and the storage capacitor 32. The buck diode is coupled between the second terminal of the buck inductor and the return line 44. Controlling the buck switch is the buck controller 66, which is responsive to the source voltage, as measured between the power line and the return line, and the occurrence of current pulses. In order for the buck converter to work optimally, it is preferred that the predetermined voltage level the boost converter charges the storage capacitor to is substantially above the source voltage.

In general the boost and buck converters comprise circuitry for generating a pulse width modulation switch control signal. The circuitry typically comprises comparators for providing the on/off signal supplied to the respective switches, and compares feedback signals such as the storage voltage and the source voltage to known voltage references to determine the duty cycle of the PWM signal. In this case, each converter is also responsive to an enable/disable signal provided by the current sense circuit. Since in the present invention, the boost circuit does not perform regulation, it does not require a variable duty cycle PWM control. It only needs to transfer charge from the energy source to the storage capacitor. The buck converter, however, does regulate the source voltage, and as the storage voltage decreases during transfer of charge from the storage capacitor to the load, it must be able to provide a variable duty cycle PWM signal to the buck switch for optimum performance.

Figure 2:
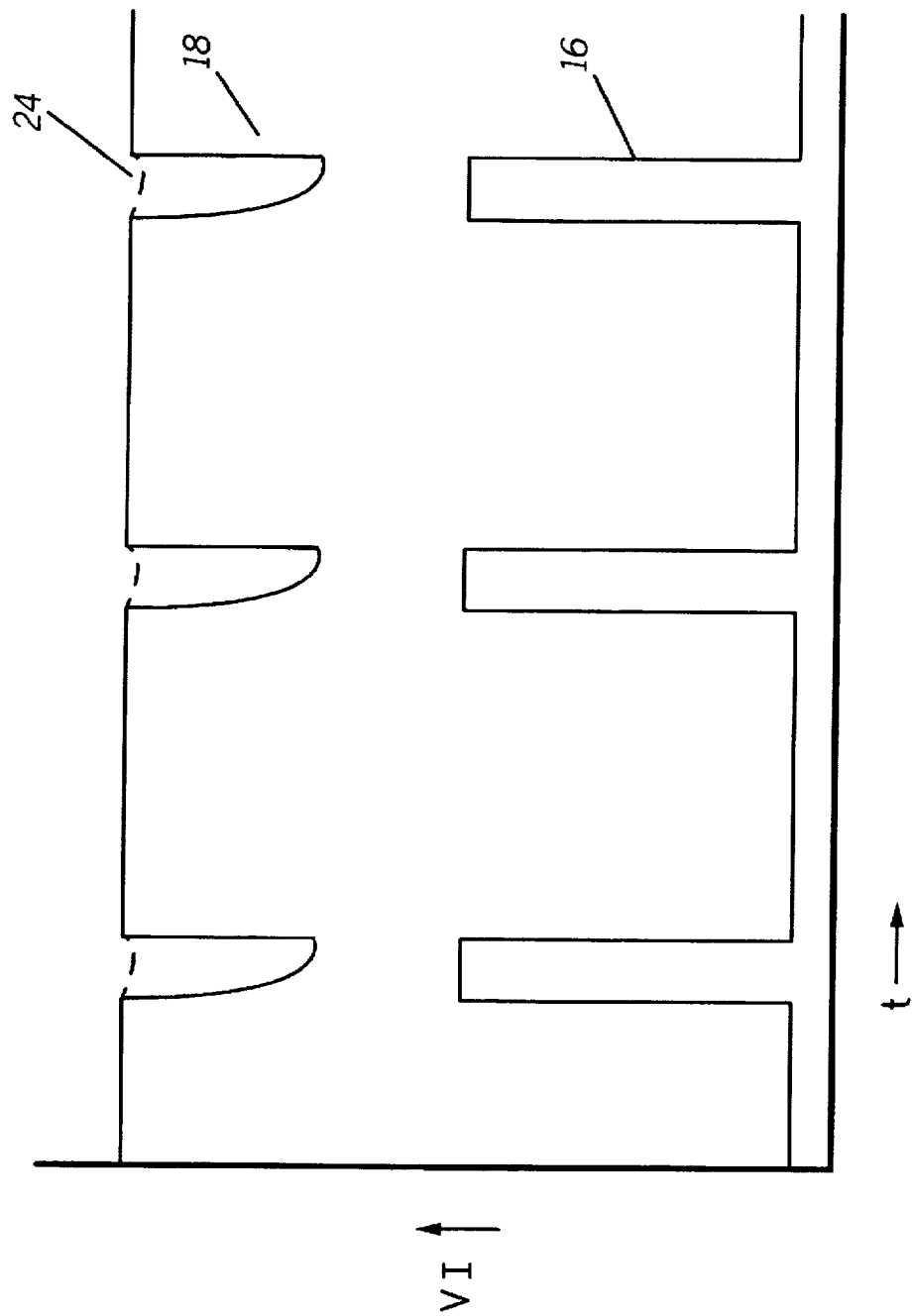
FIG. 2 is a graph of voltage and current versus time illustrating the effect of the circuit in FIG. 1.

The invention takes advantage of the relation between capacitance (C), voltage (V), and charge (q), according to the equation V=q/C. To limit the voltage drop during a current pulse, a finite amount of charge must be delivered during the current pulse from the capacitor. In bulk filtering, as illustrated in FIGS. 1 and 2, this is done with a large capacitor. In an ideal example, assuming no current is available from the battery, a capacitor charged to six volts would require a capacitance of 2 farads is required to keep the voltage ripple to less than 100 millivolts during a 100 millisecond, 2 ampere current pulse. However, by use of a boost converter, a smaller capacitor may be charged to a high voltage, thus storing the required amount of charge. In bulk filtering, the capacitor has a large overhead energy storage level, which means that most of the energy stored in the bulk capacitor is used to charge the capacitor to a nominal level. With the present invention, when the circuit is done charging the storage capacitor, most of the energy stored therein will be converted to current during the next current pulse. Immediately after the current pulse, the capacitor has relatively little energy left.

Figure 5:
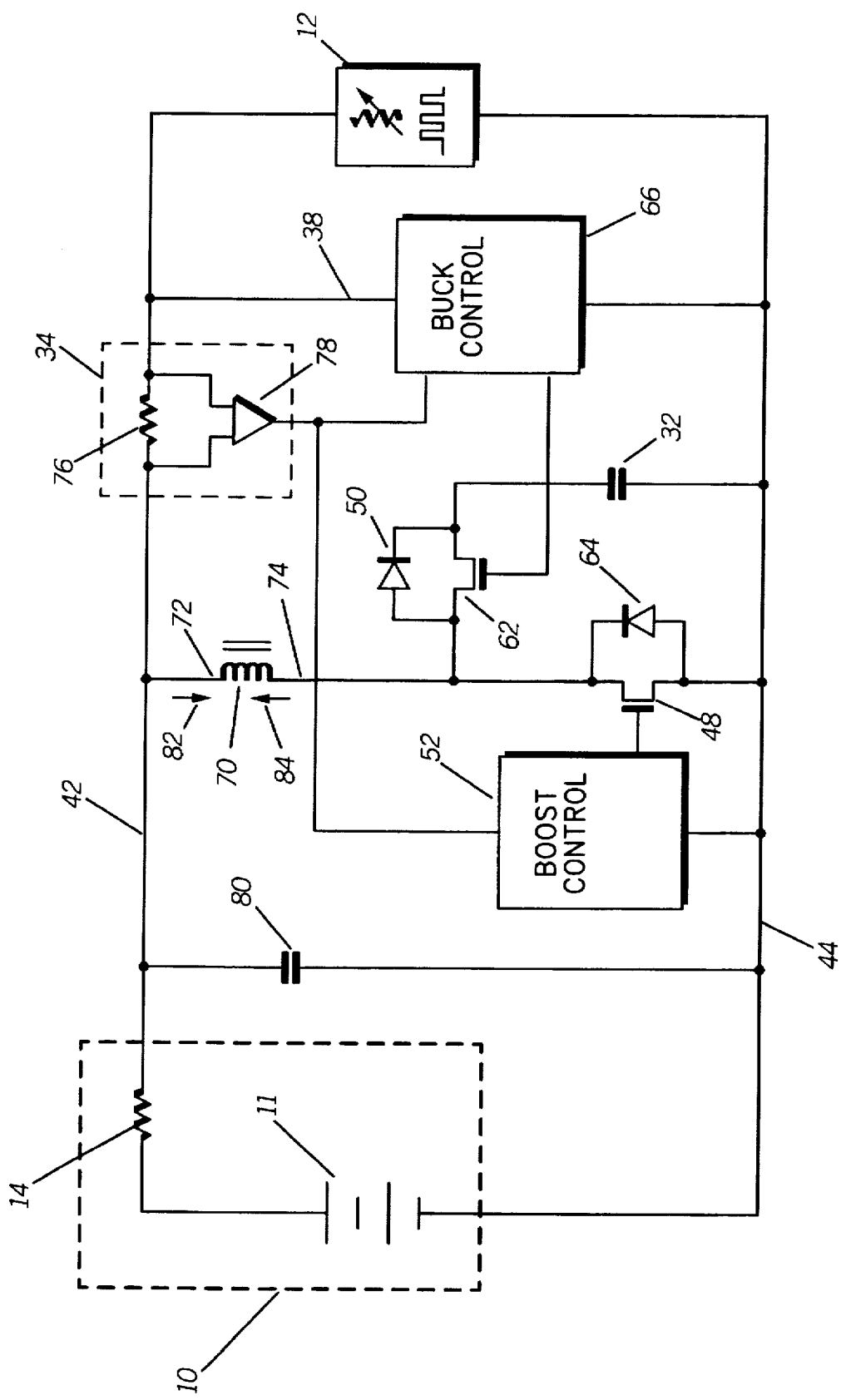
FIG. 5 is a detailed block diagram of a circuit in accordance with a second embodiment of the invention.

Referring now to FIG. 5, there is illustrated therein a detailed block diagram of a circuit in accordance with a second embodiment of the invention. The embodiment illustrated here makes use of the fact that in the previous embodiment the boost and buck inductors operate exclusively with respect to time. The boost and buck circuits operate at different times, and therefore, may share an inductor. The circuit illustrated here is essentially the same as that of FIG. 4, with some reconfiguration to eliminate one inductor.

According to the second embodiment, the circuit comprises an inductor 70 having a first terminal 72 connected to the power line 42. A boost switch 48 is coupled between the second terminal 74 of the inductor 70 and the return line 44, a boost diode 50 is coupled between the second terminal 74 and the storage capacitor 32, and a boost controller 52 controls the boost switch. The buck circuit uses the same inductor 70 as the boost circuit, but has a buck diode 64 connected in parallel with the boost switch 48, and a buck switch 62 connected in parallel with the boost diode 50. The buck control circuit 66 operates the buck switch 62 as before. The boost circuit charges the storage capacitor between current pulses, and the buck circuit discharges the storage capacitor during current pulses. Here it is shown that the current sense circuit 34 can be a series connected current sense resistor 76 and a comparator circuit 78. The current sense resistor must have very little resistance, preferably no more than 50 millivolts will be evident across it during operation. The comparator circuit will typical comprise an amplifier for increasing the magnitude of the voltage across the sense resistor, and a voltage reference for comparing with the output of the amplifier. In addition, a filter capacitor 80, connected across the battery 10 has been added because the buck circuit will typically have a slight delay before becoming fully activated. In the time between the initial occurrence of a current pulse and the time the buck circuit begins operating the filter capacitor provides charge to the power line as the source voltage is pulled down by the load.

During operation charge is transferred between the battery, storage capacitor, and load. Between current pulses the current sense circuit 34 indicates that the current is at a low level, which implies no current pulse is occurring, and as the storage voltage $V_S$ across the storage capacitor will be below the predetermined level, the boost control circuit begins switching the boost switch at its preselected frequency. Each time the boost switch closes, current is drawn through the inductor in the direction of arrow 82, which causes energy to be stored in the magnetic field of the inductor. When the boost switch is closed, the energy causes the voltage across the inductor to switch polarity, and increase sufficiently to overcome the forward voltage of the boost diode in addition to whatever voltage is presently held by the storage capacitor, thereby transferring charge to the storage capacitor.

In discharging the storage capacitor, the buck control circuit samples the source voltage by line 38, and under closed loop control switches the buck switch between open and closed to alternatively charge the inductor and allow it to discharge, thereby transferring charge from the storage capacitor to the load. It is preferred that the pulse width modulation used by the buck converter have a variable duty cycle in order to optimize the efficiency of the buck converter. As the storage voltage of the storage capacitor drops, the on-time of the buck switch increases. Buck converter control circuits are commercially available, and are typically packaged as integrated circuits.

An advantage the present invention has over the bulk filtering method is that it can be configured to regulate output current so as to avoid excessive power delivery. By designing the current sense circuit 34 to provide an analog signal proportional to the current level through it, the buck regulator can restrict current once it reaches a predetermined level. For example, if the host device will not draw more than a 2 ampere peak current pulse, the buck regulator can be configured so that no more than 2.1 amperes can be delivered. In this way, if the output of the energy source is shorted, rather than providing a large power pulse, as the bulk filter method will, the power level can be maintained at a lower level. To provide the two level current pulse indicating signal described in reference to the current sense circuit hereinabove, the same can be accomplished by including simple comparator circuits in the boost and buck control circuits. Current mode regulation in buck converters is a known technique, and many commercially available IC buck converter controllers have appropriate configurations for achieving current mode regulation.

In addition to eliminating one of the inductors of the circuit illustrated in FIG. 4, this embodiment also may allow for the elimination of additional diodes. Since the preferred switches for the boost and buck switch is a MOSFET (Metallic Oxide Semiconductor Field Effect Transistor), and it is typical for such components to have an inherent body diode in the same configuration as show, that being in parallel with the MOSFET, there may be no need for additional diode components. However, for optimum performance operation, a higher quality diode that switches faster than the inherent body diodes of MOSFETs may be preferred.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A circuit for enhancing power delivery of an energy source, said energy source containing an electrical charge, having a source voltage, and providing current pulses to a load, and being electrically connected to said load by a power line and a return line, said circuit comprising:

a storage capacitor having a storage voltage;

a boost mode converter coupled between said power line and said storage capacitor for charging said storage capacitor by transferring charge from said energy source to said storage capacitor between said current pulses until said storage voltage reaches a predetermined level, wherein said boost mode converter comprises:

an inductor having first and second terminals, said first terminal connected to said power line; a boost switch coupled between said second terminal of said inductor and said return line; a boost diode coupled between said second terminal of said inductor and said storage capacitor; and a boost control circuit responsive to said storage voltage and the occurrence of said current pulses for controlling said boost switch; and a means for discharging said storage capacitor by transferring charge from said storage capacitor to said load during said current pulses.

2. A circuit as defined by claim 1, wherein said boost control circuit operates said boost switch by pulse width modulation having a fixed duty cycle.

3. A circuit for enhancing power delivery of an energy source, said energy source containing an electrical charge, having a source voltage, and providing current pulses to a load, and being electrically connected to said load by a power line and a return line, said circuit comprising:

a storage capacitor having a storage voltage;

a means for charging said storage capacitor by transferring charge from said energy source to said storage capacitor between said current pulses until said storage voltage reaches a predetermined level; and a buck converter coupled between said power line and said storage capacitor for discharging said storage capacitor by transferring charge from said storage capacitor to said load during said current pulses, wherein said buck mode converter comprises:

an inductor having first and second terminals, said first terminal connected to said power line; a buck switch coupled between said second terminal of said inductor and said storage capacitor; a buck diode coupled between said second terminal of said inductor and said return line; and a buck control circuit responsive to said source voltage and said current pulses for controlling said buck switch.

4. A circuit as defined by claim 3, wherein said buck control circuit operates said buck switch by pulse width modulation having a variable duty cycle.

5. A circuit as defined by claim 3, further comprising a filter capacitor coupled in parallel with said energy source.

6. A circuit for enhancing power delivery of a battery, said battery containing an electrical charge, having a source voltage, and providing current pulses to a load, and being electrically connected to said load by a power line and a return line, said circuit comprising:

a storage capacitor referenced to said return line and having a storage voltage;

an inductor having a first terminal and a second terminal, said first terminal connected to said power line;

a buck diode and a boost switch connected in parallel between said second terminal of said inductor and said power line;

a boost diode and a buck switch coupled in parallel between said second terminal of said inductor and said storage capacitor;

a boost control circuit responsive to said storage voltage and the occurrence of said current pulses for controlling said boost switch thereby transferring charge from said battery to said storage capacitor between said current pulses until said storage voltage reaches a predetermined level; and a buck control circuit responsive to said source voltage and the occurrence of said current pulses for controlling said buck switch thereby transferring charge from said storage capacitor to said load during said current pulses.

7. A circuit as defined by claim 6, wherein said boost control circuit operates said boost switch by pulse width modulation having a fixed duty cycle.

8. A circuit as defined by claim 6, wherein said storage voltage is substantially higher than said source voltage.

9. A circuit as defined by claim 6, wherein said buck control circuit operates said buck switch by pulse width modulation having a variable duty cycle.

10. A circuit as defined by claim 6, further comprising a filter capacitor coupled in parallel with said battery.

* * * * *